(No Model.) 2 Sheets—Sheet 1.
C. A. DAHLSTROM.
CAR BRAKE.
No. 481,163. Patented Aug. 23, 1892.
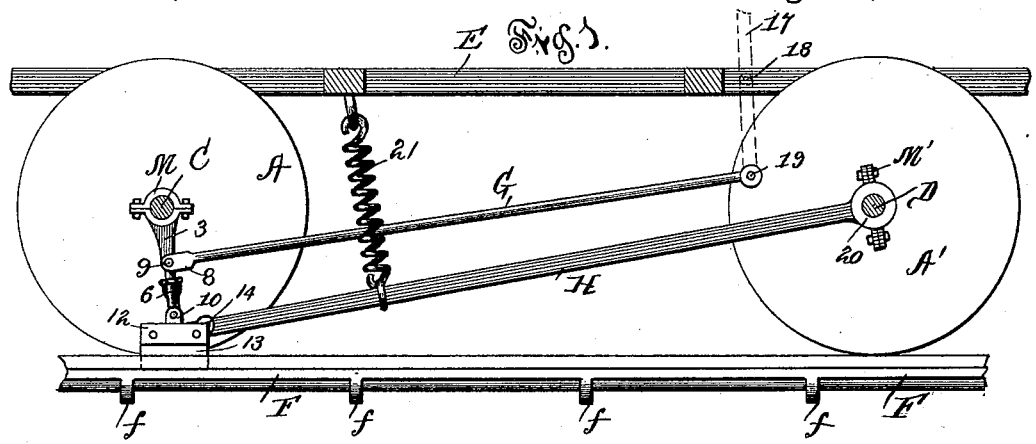
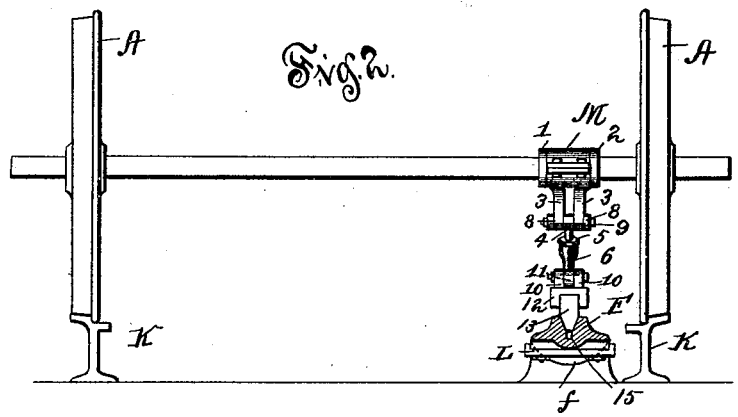
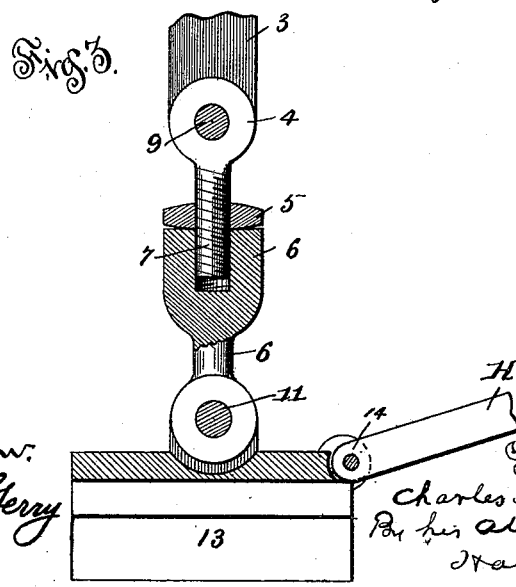
Witnesses
Wm M Rheem
J Lawrence Ferry
Inventor
Charles A Dahlstrom
By his Attorneys (No Model.) 2 Sheets—Sheet 2.
C. A. DAHLSTROM.
CAR BRAKE.
No. 481,163. Patented Aug. 23, 1892.
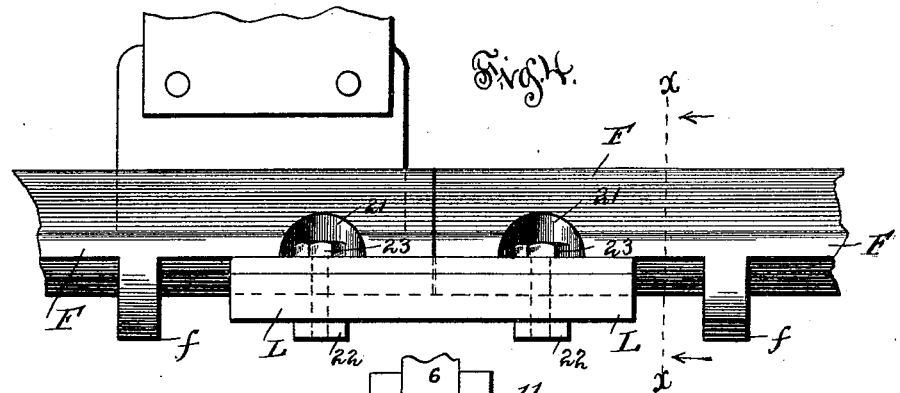
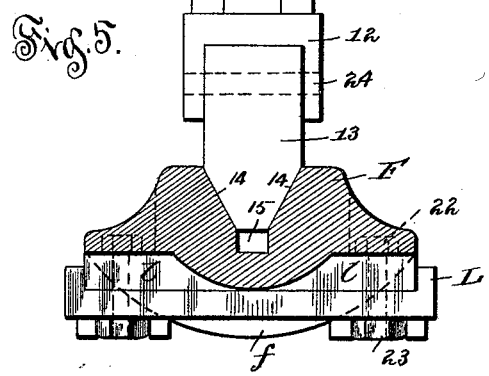
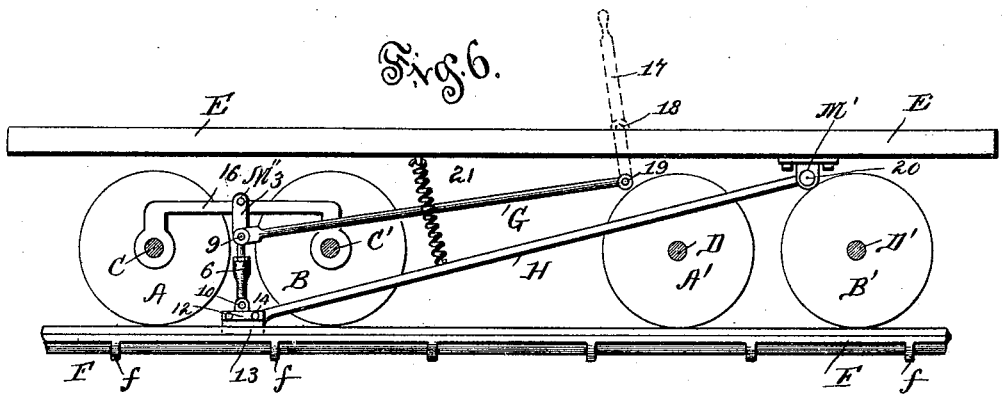
Witnesses.
Wm. M. Rheem
J. Lawrence Gerry
Inventor.
Charles A. Dahlstrom
By his Attorney
Hall Brown

UNITED STATES PATENT OFFICE.

CHARLES A. DAHLSTROM, OF CHICAGO, ILLINOIS.

CAR-BRAKE.

SPECIFICATION forming part of Letters Patent No. 481,163, dated August 23, 1892.

Application filed December 23, 1891. Serial No. 415,965. (No model.)

*To all whom it may concern:*

Be it known that I, CHARLES A. DAHLSTROM, a citizen of the United States, residing at Chicago, in the county of Cook and State of Illinois, have invented a new and useful Improvement in Car-Brakes, of which the following is a specification.

My invention relates to improvements in car-brakes; and its object is to provide a safety-brake to be applied under any circumstances where a sudden stoppage of the car is required, but more especially to be applied upon steep inclines and descending grades where the ordinary brake appliances employed upon the wheels fail to operate.

I attain these objects by the mechanism shown in the accompanying drawings, in which like letters and figures refer to the same parts throughout.

Figure 1 represents a side elevation of my invention, in which are shown the two wheels of a car and the third rail with my invention applied. Fig. 2 is an end view of two car-wheels with their axles resting upon the ordinary rails and the toggle-joint and arms employed by me in position in connection with the third rail required by my invention. Fig. 3 is a detailed cross-sectional view of the main portions of the toggle-joint and arms with the shoe attached, as shown in Fig. 6. Fig. 4 is a detail view of a particular form of rail which I prefer to employ, showing the peculiar form of chair or fish-plate for fastening the ends of such rails together. Fig. 5 is a transverse sectional view of Fig. 4 upon the line *x x;* and Fig. 6 is a side elevation of my invention as applied to a car having trucks of four wheels each, the two wheels upon one side of such car being shown with their proper attachments and the third rail.

Letter A represents the two wheels of a car where the car is supported only upon four wheels. Letters A B and A' B' represent the two side wheels of trucks where eight wheels are used.

C represents the ordinary axle upon which the wheels are located and where trucks with four wheels each are employed. C C' represent the axles of the rear truck, and D D' the axles of the forward truck.

E represents one of the beams constituting the bottom of the framework of the car proper.

F represents the third rail employed by me in my invention.

G represents a rigid rod connecting the toggle-joint with the operating-lever, which is connected with the beam or main portion of the car at the point 18.

H represents a rigid bar, which may be connected at one end with the main body of the car, as shown in Fig. 6 at M', or may be connected with the axle of the forward truck as shown in Fig. 1 at M', the other end of such rod or bar being pivotally connected to the shoe, hereinafter to be described.

K represents the ordinary rail upon which the traction-wheels of the car rest.

L represents a chair or fish-plate which I employ to unite the two ends of the third rail.

M represents the collar on the upper portion of the upper arm of the toggle-joint, which may be constructed as an integral collar; but I prefer to construct it in two parts, as shown in Figs. 1 and 2, having flanges which may be bolted together so as to embrace the axle of the car-wheels. The lower portion of this collar M is provided with lugs 3, through whose lower portions perforations are provided for the reception of the bolt 9.

The lower portion of the toggle-joint is preferably constructed of two parts 4 and 6, the part 4 being provided at its upper end with a tongue to be received between the lugs 3 of the upper arm and be held in place by the bolt 9. The lower end of the part 4 is screw-threaded, so as to be introduced into the part 6, which latter contains a female screw-thread. The nut 5 rests above the part 6 and is provided with a female screw-thread, and is used to adjust or hold permanently the two parts 4 and 6. The part 6 is provided with a tongue, which is received in the lugs 10 of the clamp 12, into which is fitted and adjusted the shoe 13, the latter being held in the former by the bolts 24. The shoe 13 at its lower extremity I prefer to have V-shaped, so as to fit properly in the groove of the third rail F, the V-shaped extension being truncate or cut off, as shown.

The rod G is provided with a U-shaped terminal, which is attached to the toggle-joint at 9, and the rod H is pivoted to the shoe at 14. The upper arm of the toggle-joint may be permanently attached to any portion of the car or to the brake-bar of the car, as shown at M' in Fig. 6, or it may be provided with a collar, as shown at M, Fig. 1, the object being to fix the pivotal attachment of the upper end of the toggle-joint to some rigid portion of the car, so that the shoe which is attached to the lower arm of the toggle-joint may be lifted and lowered, as occasion may require.

A spring 21 is attached to the body of the car or some permanent portion thereof and also to the rod H, the object of this spring being to lift the bar H and the shoe 13, to which it is attached, to a normal position after the brake has been released.

The third rail which I prefer to employ in connection with the brake is of novel construction, and I have illustrated it in perspective in Fig. 4 and in cross-section in Fig. 5. It contains within its upper surface a V-shaped slot or groove, the inclined surfaces of which are shown at 14, Fig. 5. These inclined surfaces terminate in vertical lines forming a channel 15, the purpose of this channel being to permit the full extension of the V-shaped shoe into the slot of the rail and at the same time to receive any deposit of snow or water that may collect therein and carry it off at the ends of the rails. It is evident that any form of rail may be employed, and I do not limit myself to the construction shown in the drawings, as it is only necessary that it shall be provided in its upper surface with a groove or slot capable of receiving the shoe. I prefer the V-shaped shoe and groove in the rail provided with inclined surfaces; but this may be varied in many particulars. I prefer a rail shown in Figs. 4 and 5, which is reinforced with the flanges $f$, and at their ends are provided with square projections $l$, to be received in the chair or fish-plates L, and which may be united by the bolts 22 and nuts 23. It is also evident that there may be many forms of toggle-joint or any joint employed to carry this shoe in connection with the third rail, and I do not limit myself to any particular form of construction.

The general features of my invention consist of a third rail provided with a slot, a shoe attached to the lower arm or member of a toggle or knee joint fitting adjustably to such groove or slot and held permanently in fixed position by a rod H, attached to either forward axle of the car or to some permanent portion thereof, and a rod G, pivotally attached to such toggle-joint or knee-joint and capable of operation by means of a lever 17, which is connected to the rod G at 19 and attached permanently to some portion of the body of the car, as at 18.

The mode of operation of my invention is apparent. When the shoe 13 is lifted out of connection or contact with the third rail F, the toggle-joint or knee-joint will be out of a straight line. When the lever 17 is operated, the rod G tends to either draw or shove the toggle-joint into a straight line, forcing the shoe downward into the slot or groove of the rail, the rod H holding the shoe permanently and preventing its movement in either direction longitudinally. The application of the shoe in the groove or slot creates the necessary friction and tends to retard the motion of the car, as desired, and when the lever 17 is changed the toggle-joint resumes its normal position.

Having thus described my invention, what I claim as new, and desire to secure by Letters Patent of the United States, is—

1. The combination of a car having two or more trucks, a toggle-joint the upper arm of which is pivotally connected with said car and the lower arm thereof provided with a shoe adapted to engage in a longitudinal slot or groove of a railway-rail, a rigid bar or rod pivotally attached at one end to said shoe and at the other end pivotally attached to said car, a rigid bar or rod pivotally connected at one end to said toggle-joint and at the other end to an operative lever, an operative lever pivotally attached to said car, a railway-track having rails for the wheels of said car, and a third rail provided with a longitudinal slot or groove in its upper face, adapted to engage with said shoe, whereby by means of said lever said shoe may be lowered and elevated into and from engagement with said slot or groove in said third rail, all substantially as shown.

2. The combination of a car having two or more trucks, a toggle-joint the upper arm of which is pivotally connected with said car and the lower arm thereof provided with a shoe having a truncate V-shaped face adapted to engage in a longitudinal slot or groove of a railway-rail, a rigid bar or rod pivotally attached at one end to said shoe and at the other end to said car, a second rigid bar or rod pivotally connected at one end to said toggle-joint and at the other end to an operative lever, an operative lever pivotally connected to said car and also to said second bar or rod, a railway-track having rails for the wheels of said car, and a third rail provided with a longitudinal slot or groove with inclined surfaces adapted to engage with said shoe, all substantially as shown.

3. The combination of a car having two or more trucks, a toggle-joint the upper arm of which is provided with a collar connected with and carried loosely upon one of the axles of said car, and the lower arm thereof provided with a shoe adapted to engage in a longitudinal slot or groove of a railway-rail, a rigid bar or rod pivotally attached at one end to said shoe and at the other provided with a collar which connects with and is carried loosely upon an axle of said car, a second rigid bar or rod pivotally connected at one end to said toggle-joint and at the other end to an operative lever, an operative lever pivotally connected to said car and also to said second bar or rod, a railway-track having rails for the wheels of said trucks, and a third rail provided with a longitudinal slot or groove adapted to engage with said shoe, all substantially as shown.

4. In a car-brake employing a shoe and a third rail with a longitudinal slot or groove adapted to engage with said shoe, a toggle-joint the upper arm of which is provided with a collar M, having the depending lugs 3, and the piece 4, having a tongue connecting with the lugs 3 by a bolt 9, the shank 7 being screw-threaded to engage with the screw-threaded bore of part 6 and being provided with a screw-threaded nut 5 to retain the adjustment between parts 4 and 6, 6 being provided with a tongue to engage with the lugs 10 of the clamp 12, which carries the shoe 13, all substantially as shown.

5. In a car-brake, the toggle-joint the upper arm of which is pivotally connected with the car and the lower arm provided with a shoe adapted to engage with a longitudinal slot or groove in a third rail, a rigid bar or rod connected pivotally at its respective ends with said shoe and with said car, a second bar or rod pivotally connected at its respective ends with said toggle-joint and with an operative lever attached to said car, an operative lever, a third rail provided with a longitudinal slot or groove adapted to engage with said shoe, and a spring connected with said first-mentioned bar or rod and with said car, all substantially as shown.

6. In a car-brake, a shoe supported by a toggle-joint attached to the car, in combination with a rail having a slot or groove in its upper surface capable of engaging with said shoe, and means for operating said toggle-joint and engaging and disengaging said shoe with said rail, all substantially as shown.

In testimony whereof I have hereunto set my hand in the presence of two witnesses.

CHARLES A. DAHLSTROM.

Witnesses:
WM. S. CAMERON,
J. LAWRENCE GERRY.